United States Patent [19]

McClure, III

[11] 4,138,218

[45] Feb. 6, 1979

[54] HIGH PRESSURE OXYGEN COMPRESSOR

[76] Inventor: Clifton M. McClure, III, 7228 Governors Dr., Huntsville, Ala. 35805

[21] Appl. No.: 744,200

[22] Filed: Nov. 22, 1976

[51] Int. Cl.² .............................................. B01J 7/00
[52] U.S. Cl. ................................ 422/120; 128/142.3; 422/126; 422/164
[58] Field of Search .................................. 23/281, 284

[56] References Cited

U.S. PATENT DOCUMENTS

| 3,195,986 | 7/1965 | Mann | 23/281 |
| 3,736,104 | 5/1973 | Churchill et al. | 23/281 |
| 3,737,287 | 6/1973 | Churchill et al. | 23/281 |

Primary Examiner—James H. Tayman, Jr.
Attorney, Agent, or Firm—C. A. Phillips

[57] ABSTRACT

A high-pressure oxygen generator or compressor for filling oxygen diving tanks employing a pressure vessel closely containing a chlorate oxygen producing candle. The generator includes means for initiating the release of oxygen by the candle and for transferring oxygen from the canister with minimum volumetric losses.

6 Claims, 5 Drawing Figures

U.S. Patent  Feb. 6, 1979  4,138,218

HIGH PRESSURE OXYGEN COMPRESSOR

BACKGROUND OF THE INVENTION

Life support systems employed by divers utilize either an air or oxygen tank. In the past, those utilizing oxygen have been used only principally by professional divers, this limitation being largely brought about by the unavailability of oxygen charging sources (large oxygen tanks) at diving sites. Thus, the largest sector of the diving population, amateur divers, have not generally had available oxygen-type systems, generally acknowledged to be the better type system. While self-contained oxygen generators, such as chlorate candles, have been available for some time and are now being used for medical purposes at atmospheric pressures, the applicant is unaware of the existence of any system utilizing such candles for the production of sufficient pressure to charge a diving tank, for example, tanks requiring a pressurization in the range of 1,000 to 6,000 PSI.

Accordingly, it is an object of this invention to provide a new and improved oxygen generator capable of readily, safely, and efficiently charging diving tanks to a pressure of 1,000 to 6,000 PSI.

SUMMARY OF THE INVENTION

According to this invention, an openable pressure vessel is adapted to operate and closely confine, with minimum volume losses, a chlorate-oxygen generating candle. It is adapted to provide relatively high pressure (1,000 to 6,000 PSI) oxygen from such a candle without rupturing the candles, and to provide it safely and efficiently to a diver's tank.

DETAILED DESCRIPTION OF THE DRAWINGS

Figure 2:
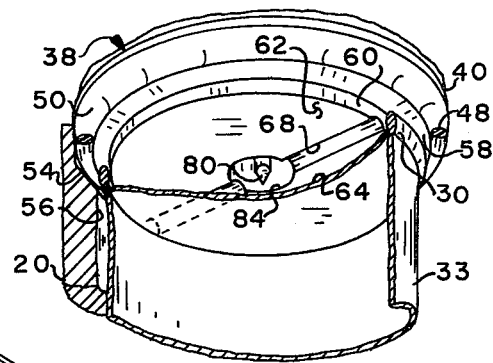
FIG. 2 is a pictorial view illustrating a detail of construction.
Figure 1:
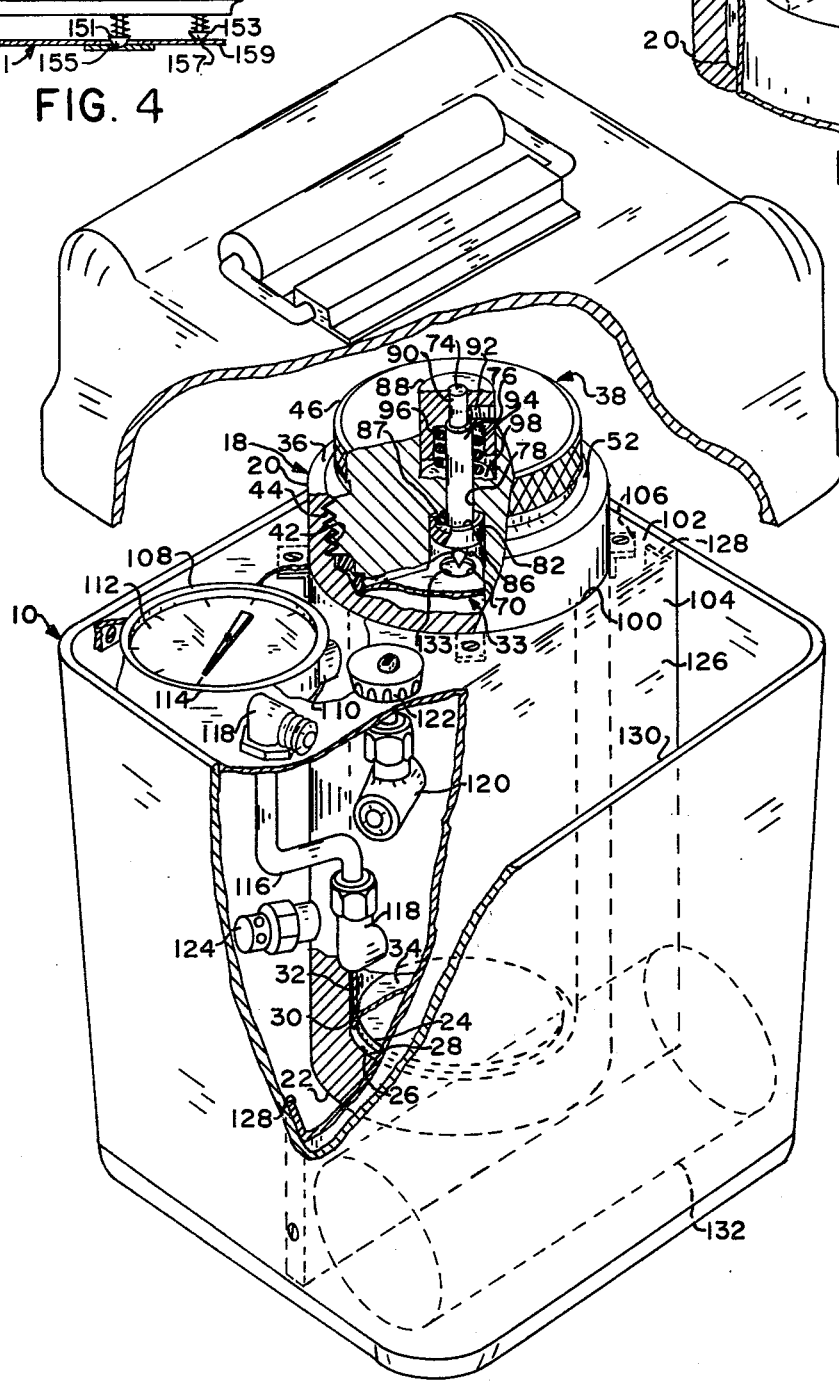
FIG. 1 is a pictorial view of an embodiment of this invention.

FIGS. 1 and 2 illustrate pictorially an embodiment of this invention. Pressure vessel 18 is adapted to encase and activate an oxygen canister or candle 33. Such a candle is housed in a metal can 32 having a conventional circular sealing rim 30. Pressure vessel 18 has a cylindrical main body, the lower end 22 of which is closed by an essentially flat bottom 24. A circular groove 26 is formed in bottom 24 providing an upwardly extending central shoulder 28 which is dimensioned to accept the inner periphery of circular sealing rim 30 of can 32. Can 32 contains a known chlorate composition and activator, activation being by means of a rupturable seal in the top of the can through which oxygen is then released.

The upwardly extending shoulder 28 of vessel 18 essentially fills the otherwise open volume interior of rim 30 of can 32. This provides a close supporting fit between vessel 18 and can 32 and fills up space which otherwise might be filled with oxygen. It is undesirable that this should occur; and, in fact, it is undesirable that there be any unnecessary volume or oxygen around the can inasmuch as the greater such space, the less quantity of oxygen that can be transferred at a given pressure.

The open upper end 36 of vessel 18 is sealed by removable plug or cap 38. Intermediate region 40 of cap 38 is provided with threads 42 around its outer perimeter. These threads are adapted to accept threaded interior region 44 of vessel 18. Upper end region 46 of cap 38 is knurled and thus forms a knob or handle region for manipulating cap 38. A gas-tight seal is formed between cap 38 and body 20 of "O" ring seal 48 supported about a curved circular groove (FIG. 2) formed around cap 38 immediately below threaded region 40. Cap 38 is tightened into opening 52 of body 20, and a gas-tight seal is formed between "O" ring 48 and flared surface 54 formed about the interior wall 56 of cylindrical vessel 18. The lower end region 58 of cap 38 is formed into circular shoulder 60 which essentially fills the exposed volume interior of rim 30 of cam 32, with the central bottom surface 62 of cap 38 being in essential contact with upper can lid surface 64. The outer and lower periphery of cap 38 loosely accepts the inner periphery of sealing rim 30. A small lateral semi-circular groove 68, having a depth of 0.01 to 0.25 inch, is formed inward of surface 62 of shoulder 60. It permits oxygen to flow from central opening 70 (FIG. 1) of upper lid 33 along the upper surface and exiting outward and over sealing rim 30 of can 32 to the side region of vessel 18. Thus, again as in the case of the lower structure of vessel 18, excess free volume in vessel 18 is eliminated.

Oxygen flow is to the side of a cavity formed by vessel 18, and there is a clearance between the side wall of can 32 in vessel 18 of approximately 0.01 to 0.1 inch. Pressure takeoff, as will by further explained, is through a side wall of vessel 18. Oxygen under pressure is allowed to migrate around can 32, and thus there is an equalization pressure between the interior and exterior sides of the can so that the can does not bulge out under pressure and lock against a side of vessel 18, which would be detrimental for two reasons. One, it could block flow to an exit; and two, it would prevent removal of a can from vessel 18. If one attempts to have the oxygen takeoff at either the top or the bottom where lock-up is not a problem, it would have been necessary to provide additional free volume regions with resulting reduced efficiency.

Flow of oxygen is initiated by rupture punch 74 which has an enlarged intermediate region 76 which is slidably journalled in center opening 78 of cap 38. After initiation, oxygen flow is out the opening created by the rupture. The lower end 80 (FIG. 2) of punch 74 is shaped into a sharp point. An annular collar 82 terminates the lower end of intermediate region 76 which is slidably engaged with an upwardly extending recess 84 formed inward of the lower surface 62 of cap 38. Circular groove 86, formed in collar 82, is dimensioned to accept an "O" ring seal 87 which forms a gas-tight seal between the upper inner surface of recess 84 and collar 82. Rupture punch 74 if operated by annular button 88 which is secured about upper end region 90 of punch 74 by set screw 92. Punch 74 is urged upward to a sealing position by compression spring 94 which is supported between flat inner surfaces 96 and 98 concentrically formed into the lower surface of button 88 and the upper surface of cap 38, respectively.

Pressure vessel 18 occupies one corner region of housing or container 10 and extends upward through opening 100 of horizontally disposed panel 102 of divider 104, being supported to panel 102 by radially spaced L-type brackets 106. The interior pressure of vessel 18 is monitored by pressure gauge 108 which is coupled to and supported by body 20 of pressure vessel 18 by threaded coupler 110. Meter face 112 extends upward through opening 114 of panel 102. An outlet tube 116 communicates with the interior of pressure vessel 18 through L-type fitting 118 which extends upward and is sealably secured about the lower end of tube 116. The upper end of tube 116 is sealably interconnected to a second L-type fitting 118 which is supported by panel 102 and is threaded to accept a desired connector (not shown). Pressure within pressure vessel 18 is selectably releasable by bleed valve 120 which communicates between the interior of vessel 18 and the outside. Valve 120 is controlled by circular knob 122 which is available above control panel 102. A secondary relief or safety valve 124 also communicates with the interior of pressure vessel 18. It is fitted with a conventional rupture-type disc (not shown) and is adapted to relieve the pressure within vessel 18 at a predetermined safe level, e.g., 500 to 1,000 PSI above the normal working pressure of the compressor. Vertically disposed panel 126 of divider 104 is secured to container 10 by L-formed flanges 128 and is spaced rearward of wall 130 of container 10 so as to provide a storage compartment for three spare oxygen generating cells 33, one being indicated in place by phantom lines 132.

Figure 3:
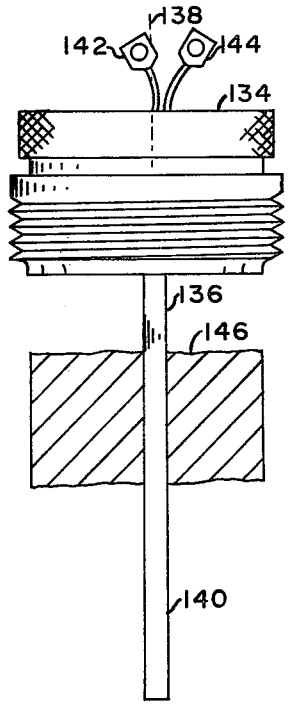
FIG. 3 is an elevational view of an alternate cap structure, enabling the generator to be employed with a special type of candle wherein heat for driving out oxygen is electrically supplied.

FIG. 3 is illustrative of an alternate cap assembly 134 which has an interior configuration similar to cap assembly 38 illustrated in FIG. 1, and thus seals pressure vessel 18 in a similar manner. An upper end region of electrical heating element 136 is sealably supported through a central opening (not shown) coaxial with the vertical axis 138 of cap 134. The lower portion 140 of heater 136 extends essentially through the length of the interior of pressure vessel 18. Power is supplied to element 136 through terminals 142 and 144. In this embodiment, an annular-shaped oxygen generator or generating cell 146 is employed of a type which releases oxygen upon the application of external heat as opposed to the type contemplated by FIG. 1 wherein chemical heating is employed in the canister to drive off oxygen.

Figure 4:
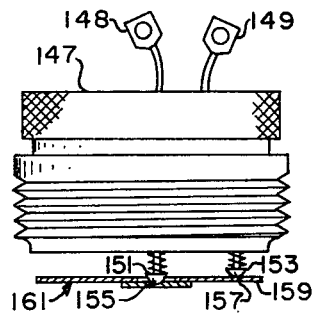
FIG. 4 is an elevational view of another alternate cap structure, enabling the generator to be employed with electrical initiated candles.

Chlorate candles have also been constructed for electrical initiation, and, accordingly, the cap structure shown in FIG. 4 is adapted to couple power through cap 147 from external power terminals 148 and 149 to internal terminals 151 and 153, the latter terminals being adapted to contact coordinately positioned terminals 155 and 157 on a power initiated oxygen generator 159. When cap 147 is screwed down into vessel 18, electrical contact is made with canister 161; and, upon the application of an appropriate potential to terminals 148 and 149, canister 161 is activated.

Figure 5:
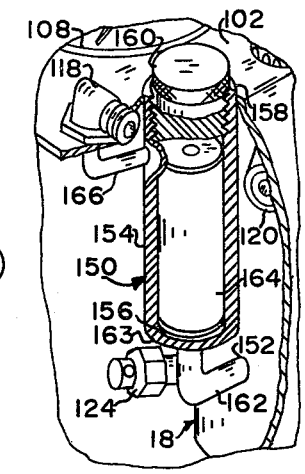
FIG. 5 is a pictorial view of a filter assembly adapted to be used with the embodiment of the invention generally illustrated in FIG. 1.

As a further modification of the invention, FIG. 5 illustrates a filter or filter assembly 150 which may be connected in series between outlet opening 152 of pressure vessel 18 and tank fill coupler 118. Filter assembly 150 includes a cylindrical canister 154 which is closed at the lower end 156 by integral wall 163 and sealed at the upper end 158 by removable cap 160. Filter 150 is adapted to receive either loose filter material, such as activated charcoal or activated silica gel or a filter canister, the filter being adapted to remove moisture generated by the oxygen generating cell and impurities, such as carbon monoxide and carbon dioxide, which may accompany the production of oxygen. Oxygen flow from opening 152 is directed into the lower interior region of canister 154 through L coupler 162, the outlet end of which passes through a central opening (not shown) in bottom wall 163. Flow is upward through filter 164 and is discharged into pipe 166 which communicates with tank fill coupler 118. Filter assembly 150 is supported by panel 102, and a portion of canister 154 extends above panel 102 so as to facilitate removal of cap 160 for filling. Filter 164 would typically be employed with lower cost candles having significant impurities, but where the lowered cost offsets the reduced efficiency resulting from the volume added to the system by filter 164.

Typically, the device of this invention would be employed to fill oxygen tanks of divers to a pressure of 1,000 to 6,000 PSI. Considering the relatively small volume of typical oxygen canisters, for example, two inches in diameter and about five and one-half inches in length, any lost volume in the generator results in a significant loss. Regions in a vessel which do not fully support a can are likely to produce a rupture of the canister due to the high pressures involved. Accordingly, the compressor includes a raised shoulder to fit snugly against the bottom region of a canister. Further, the top of the cap snugly fits down and engages the top of the canister, there being only a small groove to convey oxygen under pressure to the side of the vessel where the oxygen outlet is located. By permitting a thin film pressure to exist around the canister, expansion and rupturing of side walls is eliminated.

What is claimed is:
1. An oxygen compressor comprising:
   a chemical oxygen generating canister, said canister having a cylindrical body with a generally flat top and flat bottom;
   a cylindrical-shaped pressure vessel generally configured to surround said canister and including:
      a round cylindrical-shaped body portion dimensioned to effect a side wall clearance between said canister and said vessel of 0.01 to 0.1 inch,
      a lid, and means for sealably securing said lid to said vessel,
      centrally positioned means supported by the inside of said lid for initiating oxygen release through a central region of the top of said canister, and
      an annular portion of the inside of said lid, extending between said central region and the inside periphery of said vessel, being configured to conform to the top surface of said canister except there being shallow, 0.01 to 0.25 inch in depth, passageways between said centrally positioned means to the periphery, the area of said grooved passageways, measured along a plane of the otherwise flat conforming portion of the lid, being small compared with the area of the flat ungrooved area of said lid,
      whereby oxygen released in the center portion of the top of said canister is confined to a small passageway region as it travels to the side region of the vessel, and thereafter it is confined to a thin annular cavity sufficient to pressurize the outer side walls of the canister within the vessel and yet minimizing free volume existing between said canister and said vessel;
   an outlet conduit extending through the side wall of said vessel, and said conduit having outer end means for coupling said conduit to a tank to be charged;

pressure responsive relief means connected between the inside and ouside of said vessel for releasing inside pressure above a selected value;

a pressure indicating gauge connected to said conduit; and a second conduit extending through said vessel including outer end means for adjustably opening and closing said conduit, whereby pressure may be released from said vessel.

2. A generator as set forth in claim 1 wherein said lid includes a rupture punch for adjustably rupturing the top of said canister, whereby operation of a canister is initiated and oxygen released.

3. A generator as set forth in claim 1 wherein said lid includes an electrical heating rod extending downward from the interior of said lid, whereby a heat energizable canister having an opening to mate with said rod may be activated and oxygen released.

4. A generator as set forth in claim 1 wherein said lid includes means for connecting an electrical conduit to said canister, and said canister includes means responsive to an electrical potential for releasing oxygen.

5. A generator as set forth in claim 1 further comprising oxygen filtering means including a second vessel and a second lid sealably attachable to said second vessel for the introduction of filter material in said second vessel, said second vessel being connected in a series fluid path with said outlet conduit between said vessel and said second vessel.

6. A generator as set forth in claim 5 wherein said filter material comprises means for filtering out moisture.

* * * * *